United States Patent
Ito et al.

(10) Patent No.: US 12,435,223 B2
(45) Date of Patent: Oct. 7, 2025

(54) DARK POWDER DISPERSION LIQUID, DARK POWDER DISPERSION BODY AND COLORED LAYER-ATTACHED BASE MATERIAL

(71) Applicant: SUMITOMO METAL MINING CO., LTD., Tokyo (JP)

(72) Inventors: Takafumi Ito, Isa (JP); Keiichi Sato, Isa (JP); Mika Okada, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 468 days.

(21) Appl. No.: 17/924,438

(22) PCT Filed: Apr. 9, 2021

(86) PCT No.: PCT/JP2021/015021
§ 371 (c)(1),
(2) Date: Nov. 10, 2022

(87) PCT Pub. No.: WO2021/246055
PCT Pub. Date: Dec. 9, 2021

(65) Prior Publication Data
US 2023/0272225 A1    Aug. 31, 2023

(30) Foreign Application Priority Data

Jun. 5, 2020 (JP) .................... 2020-098196
Nov. 18, 2020 (JP) .................... 2020-191647

(51) Int. Cl.
C09D 5/03      (2006.01)
C09D 7/20      (2018.01)
(Continued)

(52) U.S. Cl.
CPC ............. *C09D 5/032* (2013.01); *C09D 5/031* (2013.01); *C09D 5/035* (2013.01); *C09D 7/20* (2018.01);
(Continued)

(58) Field of Classification Search
CPC ........ C09D 5/031; C09D 5/032; C09D 5/035; C09D 157/12; C09D 7/61; C09D 7/20; C09D 7/67; C09D 7/70
See application file for complete search history.

(56) References Cited

U.S. PATENT DOCUMENTS

2010/0210772 A1    8/2010   Hiwatashi
2014/0127522 A1    5/2014   Fujita et al.
2015/0024211 A1    1/2015   Miratsu et al.

FOREIGN PATENT DOCUMENTS

CN    105293578 A      2/2016
EP    3 712 224    *   9/2020   ............. C01G 41/00
(Continued)

OTHER PUBLICATIONS

Dec. 6, 2022 International Preliminary Report on Patentability issued in International Patent Application No. PCT/JP2021/015021.
(Continued)

*Primary Examiner* — Pegah Parvini
(74) *Attorney, Agent, or Firm* — Oliff PLC (57) ABSTRACT

A dark powder dispersion liquid including a dark pigment, composite tungsten oxide particles and a solid medium, wherein a mass ratio of the dark pigment to the composite tungsten oxide particles (mass of dark-colored pigment/mass of composite tungsten oxide fine particles) is 0.01 or more and 5 or less.

12 Claims, 1 Drawing Sheet (51) Int. Cl.
*C09D 7/40* (2018.01)
*C09D 7/61* (2018.01)
*C09D 157/12* (2006.01)

(52) U.S. Cl.
CPC ............... *C09D 7/61* (2018.01); *C09D 7/67* (2018.01); *C09D 7/68* (2018.01); *C09D 7/70* (2018.01); *C09D 157/12* (2013.01)

(56) References Cited

FOREIGN PATENT DOCUMENTS

| | | |
|---|---|---|
| JP | 2000-214310 A | 8/2000 |
| JP | 2007-311208 A | 11/2007 |
| JP | 2007-314752 A | 12/2007 |
| JP | 2008-194563 A | 8/2008 |
| JP | 2008-231164 A | 10/2008 |
| JP | 2012-229388 A | 11/2012 |
| JP | 2013-170239 A | 9/2013 |
| JP | 2015-117353 A | 6/2015 |
| JP | 2015-196622 A | 11/2015 |
| WO | 2009/020207 A1 | 2/2009 |

OTHER PUBLICATIONS

Jun. 3, 2024 Extended Search Report issued in European Patent Application No. 21818569.2.
Jun. 29, 2021 International Search Report issued in International Patent Application No. PCT/JP2021/015021.

* cited by examiner

ND ARK POWDER DISPERSION LIQUID, DARK POWDER DISPERSION BODY AND COLORED LAYER-ATTACHED BASE MATERIAL

BACKGROUND

Technical Field

The present disclosure relates to a dark powder dispersion liquid, a dark powder dispersion body, and a colored layer-attached base material, which are used for coloring windows, etc., of automobiles and buildings.

Description of Related Art

Generally, privacy is protected and a design is increased by applying a light-shielding film to a window of an automobile and a building to prevent an inside of the vehicle or the building from being seen through from an outside of the vehicle or the building.

Such a light-shielding film is a film in which a colored layer is provided on a surface of a transparent film base material such as a PET film, and the colored layer is a pigment dispersion body in which a pigment is dispersed in a solid medium resin. As such a pigment, it is known to use Cu—Fe—Mn composite oxide pigment, Cu—Cr composite oxide pigment, Cu—Cr—Mn composite oxide pigment, Cu—Cr—Mn—Ni composite oxide pigment, Cu—Cr—Fe composite oxide pigment, Fe—Cr composite oxide pigment and Co—Cr—Fe composite oxide pigment, titanium black, titanium nitride, titanium oxynitride, dark azo pigment, perylene black pigment, aniline black pigment, and carbon black.

For example, Patent Document 1 discloses a technique for a light-shielding film in which a haze value is kept low.

PRIOR ART DOCUMENT

Patent Document

[Patent Document 1] JP-A-2000-214310

SUMMARY OF THE DISCLOSURE

Problem to be Solved by the Disclosure

Generally, in order to improve the design of an automobile and a building, a light-shielding film is required to have a deep black color with a low chroma. However, a dark powder dispersion body in which a dark pigment is dispersed in a solid medium such as a resin, has a high chroma due to the color of the dark pigment, and a deep black color with a low chroma cannot be obtained in some cases.

Further, depending on an intended use of the light-shielding film, there are cases where humidity and heat resistance is required.

In view of the above circumstances, the above disclosure is provided, and an object of the present disclosure is to provide a dark powder dispersion body exhibiting a deep black color with low chroma, a colored layer-attached base material, and a dark powder dispersion liquid for forming them, and further provide a dark powder dispersion body with excellent humidity and heat resistance, a colored layer-attached base material, and a dark powder dispersion liquid for forming them.

Means for Solving the Problem

That is, in order to solve the above problem, a first invention provides a dark powder dispersion liquid, including
a dark pigment;
composite tungsten oxide particles;
and a solvent,
wherein a mass ratio of the dark pigment to the composite tungsten oxide particles (mass of dark pigment/mass of composite tungsten oxide fine particles) is 0.01 or more and 5 or less.

Advantage of the Disclosure

According to the present disclosure, a dark powder dispersion body exhibiting a deep black color with low chroma and a colored layer-attached base material, can be realized.

DETAILED DESCRIPTION OF THE DISCLOSURE

The present invention provides a dark powder dispersion liquid including a dark pigment, composite tungsten oxide particles, and a solvent, wherein a mass ratio of the dark pigment to the composite tungsten oxide particles (mass of dark pigment/mass of the composite tungsten oxide fine particles) is 0.01 or more and 5 or less, and the dark powder dispersion liquid is used to produce a dark powder dispersion body and a colored base material.

Hereinafter, the present invention will be described in an order of (1) a dark pigment, (2) composite tungsten oxide fine particles, (3) a dark powder dispersion liquid, (4) a dark powder dispersion body, and (5) a colored layer-attached base material.

(1) Dark Pigment

A dark pigment is a pigment that colors a dark powder dispersion body in a colored layer of a light-shielding film and lowers a visible light transmittance.

However, the dark pigment may have a yellowish or greenish tint. Therefore, it may be difficult to achieve deep blackness with low chroma only by using these dark pigments.

In the present invention, chroma means chroma $c^*$ in a $L^*$, $a^*$, $b^*$ color system based on JIS Z 8701 1999 and JIS Z 8781-4 2013. The chroma $c^*$ is expressed by the following formula (1).

$$\text{Chroma } c^* = (a^{*2} + b^{*2})^{1/2} \qquad \text{Formula 1}$$

Here, the present inventors came up with an idea of using a mixture of a dark pigment (black pigment) selected from Cu—Fe—Mn composite oxide pigment, Cu—Cr composite oxide pigment, Cu—Cr—Mn composite oxide pigment, Cu—Cr—Mn—Ni composite oxide pigment, Cu—Cr—Fe composite oxide pigment, Fe—Cr composite oxide pigment, Co—Cr—Fe composite oxide pigment, titanium black, titanium nitride, titanium oxynitride, dark azo pigment, perylene black pigment, aniline black pigment, carbon black, and composite tungsten oxide fine particles which will be described later.

That is, the deep black color with low chroma is realized by supplementing yellowish and greenish tint of the dark pigment with bluish tint of the composite tungsten oxide fine particles.

Among these dark pigments, Cu—Fe—Mn composite oxide pigment, Cu—Cr composite oxide pigment, Cu—Cr—Mn composite oxide pigment, Cu—Cr—Mn—Ni composite oxide pigment, Cu—Cr—Fe composite oxide pigment, Fe—Cr composite oxide pigment and Co—Cr—Fe composite oxide pigment are known to be composite oxides having a spinel structure. Then, a compound such as Cu, Fe, and Mn is used as a raw material, and is synthesized by firing at a temperature of 500° C. or higher.

As for the color of the pigment, for example, when a material that shields light in a short wavelength region is used, the short wavelength region of visible light (blue) is also slightly shielded, and the dark powder dispersion body has a yellowish tint. On the other hand, when a material that shields light in a long wavelength region is used, the long wavelength region of visible light (red) is also slightly shielded, and the dark powder dispersion body has a bluish tint. Then, when a material that shields light in both the short and long wavelength regions is used, the dark powder dispersion body will be greenish. Therefore, it is found that by combining the dark pigment and the composite tungsten oxide fine particles, a deep black color with low chroma can be expressed in the dark color powder dispersion body of the present invention.

Then preferably, since the composite tungsten oxide fine particles absorb and shield near-infrared ray more than visible light, when the dark powder dispersion body of the present invention is used for a light-shielding film, it is possible to obtain an effect of absorbing and shielding near-infrared rays contained in sunlight, preventing them from entering the room, and suppressing an increase in room temperature.

An average dispersed particle size of the dark pigment is preferably 200 nm or less, more preferably 1 nm or more and 100 nm or less. This is because when the average dispersed particle size of the dark pigment exceeds 200 nm, a haze of the dark powder dispersion body may increase. The average dispersed particle size of the dark pigment can be measured using an ELS-8000 manufactured by Otsuka Electronics Co., Ltd. based on a dynamic light scattering method.

(2) Composite Tungsten Oxide Fine Particles

Regarding the composite tungsten oxide fine particles used in the present invention, (a) property of the composite tungsten oxide fine particles and (b) a method for producing the composite tungsten oxide fine particles, will be described in this order.

(a) Property of the Composite Tungsten Oxide Fine Particles

When the composite tungsten oxide fine particles have a composition represented by a general formula $M_xW_yO_z$ (wherein M is H, He, alkali metals, alkaline earth metals, rare earth elements, one or more elements selected from Mg, Zr, Cr, Mn, Fe, Ru, Co, Rh, Ir, Ni, Pd, Pt, Cu, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, and W is tungsten, O is oxygen, satisfying $0.001 \leq x/y \leq 1$, $2.0 < z/y \leq 3.0$), the composite tungsten oxide fine particles exhibit near-infrared absorbing properties and become near-infrared absorbing fine particles, which is a preferable composition.

The composite tungsten oxide fine particles represented by the general formula $M_xW_yO_z$ will be further described. The values of the M element, x, y, and z in the general formula $M_xW_yO_z$ and the crystal structure thereof are closely related to a free electron density of the near-infrared absorbing fine particles, and greatly affect the near-infrared absorbing properties.

In general, the near-infrared absorption properties are low because effective free electrons do not exist in tungsten trioxide ($WO_3$).

It is found by the present inventors that by adding element M (wherein the element M is one or more kinds selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb) to the tungsten oxide to produce a composite tungsten oxide, free electrons are generated in the composite tungsten oxide, absorption properties derived from the free electrons appear in a near-infrared region, and it becomes effective as a near-infrared absorbing material with a wavelength of around 1000 nm, and the composite tungsten oxide is maintained in a chemically stable state and is effective as a near-infrared absorbing material with excellent weather resistance. Further, the element M is preferably Cs, Rb, K, Tl, Ba, Cu, Al, Mn, or In. Especially, when the element M is Cs or Rb, the composite tungsten oxide tends to have a hexagonal crystal structure, and exhibits the property of transmitting visible light and absorbing and shielding near-infrared rays.

Here, finding of the present inventors regarding a value of x which indicates an amount of the added element M, will be described.

When the value of x/y is 0.001 or more, a sufficient amount of free electrons are generated and a desired near-infrared absorption property can be obtained. Then, as the amount of the added element M increases, an amount of supplied free electrons increases and the near-infrared absorption properties also improve. However, the effect saturates when the value of x/y is about 1. Further, when the value of x/y is 1 or less, it is possible to avoid a formation of an impurity phase in the composite tungsten fine particles, which is preferable.

Next, the finding of the present inventors regarding a value of z indicating a control of an oxygen amount will be described.

In the composite tungsten fine particles represented by the general formula $M_xW_yO_z$, the value of z/y is preferably $2.0 < z/y \leq 3.0$, more preferably $2.2 \leq z/y \leq 3.0$, still more preferably $2.6 \leq z/y \leq 3.0$, most preferably $2.7 \leq z/y \leq 3.0$. When this z/y value exceeds 2.0, it is possible to avoid an appearance of a crystal phase of $WO_2$, which is a compound other than an intended compound, in the composite tungsten oxide, and chemical stability as a material can be obtained, and therefore the above composite tungsten fine particles can be used as an effective near-infrared absorbing material. On the other hand, when the value of z/y is 3.0 or less, a required amount of free electrons is generated in the tungsten oxide, and the above composite tungsten fine particles can be used as an efficient near-infrared absorbing material.

The composite tungsten oxide fine particles have a structure of tetragonal or cubic tungsten bronze in addition to the hexagonal structure, but are effective as a near-infrared absorbing material regardless of which structure they have. However, an absorption position in the near-infrared region tends to change depending on the crystal structure of the composite tungsten oxide fine particles. That is, the absorption position in the near-infrared region tends to move to a longer wavelength side in the tetragonal crystal than in the cubic crystal, and to move further to the longer wavelength side in the hexagonal crystal than in the tetragonal crystal. Further, accompanying the change in the absorption position, the hexagonal crystal has a lowest absorption in a visible light region, followed by the tetragonal crystal, and the cubic crystal has a highest absorption among them.

Based on the above finding, it is preferable to use the hexagonal tungsten bronze for the purpose of transmitting more lights in the visible light region and shielding more lights in the near-infrared region. When the composite tungsten oxide fine particles have a hexagonal crystal structure, the fine particles have improved transmission in the visible light region and improved absorption in the near-infrared region.

When the composite tungsten oxide fine particles having a hexagonal crystal structure have a uniform crystal structure, the amount of the added element M is preferably 0.2 or more and 0.5 or less, more preferably $0.29 \leq x/y \leq 0.39$ in terms of the value of x/y. Theoretically, when z/y=3, the value of x/y is 0.33. Then, it is considered that the added element M is arranged in all hexagonal voids.

An average dispersed particle size of the composite tungsten oxide fine particles is preferably 800 nm or less and 1 nm or more, more preferably 200 nm or less and 1 nm or more. The fact that the composite tungsten oxide fine particles preferably have an average dispersed particle size of 200 nm or less is the same for the composite tungsten oxide fine particles in the dark powder dispersion liquid. This is because haze can be kept low when the average dispersed particle size is 200 nm or less. The average dispersed particle size is preferably 1 nm or more, more preferably 10 nm or more. The average dispersed particle size can be measured using an ELS-8000 manufactured by Otsuka. Electronics Co., Ltd. based on a dynamic light scattering method.

Then, in the composite tungsten oxide fine particle dispersion body in which these composite tungsten oxide fine particles are individually dispersed in a solid medium such as a resin, $a*$ and $b*$ show negative values in a $L*$, $a*$, $b*$ color system, and the composite tungsten oxide fine particle dispersion body has a bluish tint. The bluish coloring is not so strong in a region where the visible light transmittance exceeds 70%, but is strong in a region where the visible light transmittance is as low as 5 to 70%. Further, when the visible light transmittance is extremely low, such as less than 1%, a film has a black tint, and the bluish tint becomes inconspicuous, but high chroma and deep black cannot be realized.

(b) Method for Producing Composite Tungsten Oxide Fine Particles

The composite tungsten oxide fine particles represented by the general formula $M_xW_yO_z$ can be obtained by heat-treating a tungsten compound starting material in an inert gas atmosphere or a reducing gas atmosphere.

First, the tungsten compound starting material will be described.

The tungsten compound starting material is preferably one or more selected from tungsten trioxide powder, tungsten dioxide powder, or tungsten oxide hydrate, or tungsten hexachloride powder, or ammonium tungstate powder, or tungsten oxide hydrate powder obtained by dissolving tungsten hexachloride in alcohol and then drying it, or tungsten oxide hydrate powder obtained by dissolving tungsten hexachloride in alcohol, adding water to cause precipitation, and drying the precipitate, or tungsten compound powder obtained by drying an ammonium tungstate aqueous solution, and metallic tungsten powder.

When producing the composite tungsten oxide fine particles, it is more preferable to use an ammonium tungstate aqueous solution or a tungsten hexachloride solution from a viewpoint that each element whose starting material is a solution can be uniformly mixed easily. Composite tungsten oxide fine particles can be obtained by heat-treating these raw materials in an inert gas atmosphere or a reducing gas atmosphere. Further, a tungsten compound containing the element M in the form of a single element or a compound, is used as a starting material.

Here, in order to produce a starting material in which each component is homogeneously mixed at a molecular evel, it is preferable to mix each raw material in a solution, and it is preferable to use the tungsten compound starting raw material that contains the element M and is soluble in a solvent such as water or an organic solvent. For example, preferable examples include, but are not limited to, tungstates, chloride salts, nitrates, sulfates, oxalates, oxides, carbonates, hydroxides, etc., containing the element M, as long as a solution is formed thereby.

Next, heat treatment in the inert gas atmosphere or the reducing gas atmosphere will be described.

First, a heat treatment condition in the inert gas atmosphere is preferably 650° C. or higher. A starting material heat-treated at 650° C. or higher has a sufficient near-infrared absorbing power and is efficient as heat ray shielding fine particles. As the inert gas, an inert gas such as Ar or $N_2$ is preferably used.

Further, a heat treatment condition in the reducing atmosphere is as follows: it is preferable to first heat-treat the starting material at a temperature of 100° C. to 650° C. in the reducing gas atmosphere, and then heat-treat it at a temperature of 650° C. to 1200° C. in the inert gas atmosphere. The reducing gas at this time is not particularly limited, but $H_2$ is preferable. Then, when $H_2$ is used as the reducing gas, the composition of the reducing atmosphere is preferably, for example, an inert gas such as Ar or $N_2$ mixed with $H_2$ at a volume ratio of 0.1% or more, and more preferably, it is mixed at 0.2% or more. When the $H_2$ content is 0.1% or more at a volume ratio, reduction can proceed efficiently.

Hydrogen-reduced starting material powder contains a Magneli phase and exhibits good heat ray shielding property. Accordingly, even in this state, the particles can be used as heat ray shielding fine particles.

The surface of the composite tungsten oxide fine particles according to the present invention is preferably coated with a compound, preferably an oxide, containing one or more of Si, Ti, Zr and Al, from a viewpoint of improving weather resistance. In order to perform a surface treatment, a known surface treatment may be performed using a compound which is an organic compound containing one or more of Si, Ti Zr and Al. For example, the composite tungsten oxide fine particles and an organosilicon compound may be mixed and hydrolyzed.

(3) Dark Powder Dispersion Liquid

The dark powder dispersion liquid according to the present invention is obtained by mixing and dispersing the above-described dark pigment and composite tungsten oxide in an appropriate solvent.

Hereinafter, explanation will be given for the dark powder dispersion liquid according to the present invention, in an order of (a) mixing ratio of the dark pigment and the composite tungsten oxide fine particles, (b) solvent, (c)

dispersant, (d) a method for producing the dark powder dispersion liquid, and (e) other additive.

(a) Mixing Ratio of the Dark Pigment and the Composite Tungsten Oxide Fine Particles The mixing ratio of the dark pigment and the composite tungsten oxide fine particles (mass of the dark pigment/mass of the composite tungsten oxide fine particles) contained in the dark powder dispersion liquid according to the present embodiment is 0.01 or more and 5 or less, preferably 0.05 or more and 1 or less, more preferably 0.1 or more. 0.2 or less.

That is, by combining the dark pigment and the composite tungsten oxide fine particles at a predetermined ratio, a deep black color with low chroma is realized by supplementing yellowish and greenish tints of the dark pigment with a blue tint of the composite tungsten oxide fine particles.

As for the color of the pigment, when a material that shields ultraviolet light is used, the short wavelength region (blue) of the visible light is also slightly shielded, and the dark powder dispersion body has a yellowish tint. On the other hand, when a material that shields near-infrared rays is used, the long-wavelength region of the visible light (red) is also slightly shielded, resulting in a bluish tint. Then, when a material that shields both ultraviolet rays and near-infrared rays is used, it has a greenish tint. Therefore, it is found that by combining the dark pigment and the composite tungsten oxide fine particles, a deep black color with low chroma can be expressed in the dark color powder dispersion body of the present embodiment.

Then, since the composite tungsten oxide fine particles absorb and shield near-infrared rays more than visible lights, when the dark powder dispersion body according to the present embodiment is used as a light-shielding film or as a colored layer-attached base material, it is possible to absorb and shield near-infrared rays contained in sunlight, prevent them from entering indoors and automobiles, and suppress temperature rise.

(b) Solvent

The solvent used in the dark powder dispersion liquid according to the present invention is not particularly limited, and may be appropriately selected according to a binder when containing an inorganic binder or a resin binder, under a coating/kneading condition, in a coating/kneading environment. For example, various organic solvents such as water, alcohols such as ethanol, propanol, butanol, isopropyl alcohol, isobutyl alcohol, diacetone alcohol, ethers such as methyl ether, ethyl ether, propyl ether, esters, ketones such as acetone, methyl ethyl ketone, diethyl ketone, cyclohexanone, isobutyl ketone, aromatic hydrocarbons such as toluene, can be used.

Further, a resin monomer or oligomer may be used as the solvent. Further, a liquid resin in which a styrene resin, etc., is dissolved in toluene, or a liquid plasticizer for plastics may be used.

Further, a mixture of the solvents described above may also be used.

The solvent is preferably contained in the dark powder dispersion liquid of the present embodiment, in an amount of 50 parts by mass or more and 2000 parts by mass or less, more preferably 200 parts by mass or more, with respect to a total of 100 parts by mass of the dark pigment and the composite tungsten oxide fine particles.

(c) Dispersant

In order to further improve a dispersion stability of the fine particles in the dark powder dispersion liquid, it is of course possible to add various dispersants, surfactants, coupling agents, etc. Further, when water or a water-soluble organic substance is used as the solvent, an acid or an alkali may be added as necessary to adjust pH of the dispersion liquid.

The dispersant is desirably a polymer dispersant having an amino group. It adsorbs on the surface of the dark pigment particles and the composite tungsten oxide fine particles described above, prevents aggregation of the composite tungsten oxide fine particles, and is effective in dispersing these fine particles uniformly in the dark powder dispersion body. The polymer dispersant having an amino group preferably has an amine value of 5 to 100 mgKOH/g and a molecular weight Mw of 2,000 to 200,000.

The amino group polymer dispersant according to the present embodiment is a compound having a basic group such as an amino group in a molecule of the dispersant. An example of such a compound having the basic group such as an amino group in the molecule of the dispersant includes polyolefin resin, polyester resin, acrylic resin, polyurethane resin, and amide resin in a main chain. A compound having an acrylic resin in a main chain is more preferable.

Further, examples of the preferable commercially available polymer dispersants having such amino groups include: amino group polymer dispersants manufactured by BYK-Chernie Japan, such as Disperbyk-112, Disperbyk-116, Disperbyk-130, Disperbyk-161, Disperbyk-162, Disperbyk-164, Disperbyk-166, Disperbyk-167, Disperbyk-168, Disperbyk-2001, Disperbyk-2020, Disperbyk-2050, Disperbyk-2070, and Disperbyk-2150, amino group polymer dispersants manufactured by Ajinomoto Fine-Techno Co., Inc. such as Ajisper PB821, Ajisper PB822, Ajisper PB711, amino group polymer dispersants manufactured by Kusumoto Kasei Co., Ltd., such as Disparlon 1860, Disparlon DA703-50, Disparlon DA7400, and amino group polymer dispersants manufactured by BASF Japan Co., Ltd., such as EFKA-4400, EFKA-4401, EFKA-5044, EFKA-5207, EFKA-6225, EFKA-4330, EFKA-4047, EFKA-4060.

Further, a dispersant having a hydroxyl group and/or a carboxyl group may be used in combination with the amino group polymer dispersant, or a polymer dispersant with an amino group may have a hydroxyl group and/or a carboxyl group. Any of such polymer dispersants adsorbs on the surface of the composite tungsten oxide fine particles described above, prevents aggregation of the composite tungsten oxide fine particles and exhibits the effect of uniformly dispersing these fine particles in the dark powder dispersion body.

The polymer dispersant having a hydroxyl group preferably has an OH value of 10 to 200 mgKOH/g and a molecular weight Mw of 1,000 to 150,000.

Examples of the polymer dispersant having the hydroxyl group according to the present embodiment include an acrylic resin having a hydroxyl group (sometimes called acrylic polyol), an acrylic/styrene copolymer having a hydroxyl group, etc.

An example of the polymer dispersant having the hydroxyl group includes acrylic polyol and a commercially available product such as UH series manufactured by Toagosei Co., Ltd.

The polymer dispersant having the carboxyl group preferably has an acid value of 0.1 to 100 mgKOH/g and a molecular weight Mw of 2,000 to 200,000.

Examples of the polymer dispersant having the carboxyl group according to the present embodiment include an acrylic resin and an acrylic-styrene copolymer, etc., having the carboxyl group.

Examples of the polymer dispersant having the carboxyl group include commercially available acrylic resin having an acid value of 1 or more, UC series and UF series manufactured by Toagosei Co., Ltd., etc.

In the dark powder dispersion liquid according to the present invention, a total content of these polymer dispersants is preferably 20 parts by mass or more and 200 parts by mass or less as the solid content of the dispersant with respect to a total of 100 parts by mass of the dark pigment and the composite tungsten oxide fine particles. This is because when the content of the polymer dispersant is within this range, the dark pigment and the composite tungsten oxide fine particles are uniformly dispersed in the dark powder dispersion body, and a low haze can be achieved. Specifically, by containing 20 parts by mass or more of the amino group polymer dispersant with respect to a total of 100 parts by mass of the dark pigment and the composite tungsten oxide fine particles, the haze value of the dark powder dispersion body can be reduced, and by containing 200 parts by mass or less, a mechanical strength of the dark powder dispersion body can be ensured.

(d) A Method for Producing the Dark Powder Dispersion Liquid

A dispersion method for producing the dark powder dispersion liquid may be a method for uniformly dispersing the dark pigment and the composite tungsten oxide fine particles in the dispersion liquid, and for example, a bead mill, a ball mill, a sand mill, a paint shaker, an ultrasonic homogenizer, etc., can be used.

Further, in order to obtain the dark powder dispersion liquid, a pigment dispersion liquid containing a dark pigment, a solvent and a polymer dispersant optionally added, and a composite tungsten oxide dispersion liquid containing composite tungsten oxide fine particles, a solvent, and a polymer dispersant optionally added, are prepared by the dispersion method described above, so that each of them may be mixed in a predetermined value of the mixing ratio of the dark pigment and the composite tungsten oxide fine particles.

(e) Other Additive

When humidity and heat resistance is required in "(4) dark powder dispersion body" or "(5) colored layer-attached base material" described later, it is also preferable to add an additive to the dark powder dispersion liquid used for producing them, to improve the humidity and heat resistance.

In view of the fact that the dark powder dispersion body and the colored layer-attached base material according to the present invention may be used in a situation where humidity and heat resistance is required, the inventors of the present invention conducted research on the cause of a deterioration of the near-infrared shielding properties of the dark powder dispersion body and the colored layer-attached base material over time due to humidity and heat. Then, it is found that humidity intruding from the air, metal ions derived from dark powder, or ultraviolet rays from the outside act catalytically on a solid medium and a transparent film base material, causing decomposition and deterioration. It is estimated that a decomposition product (radical) generated during the decomposition and deterioration desorb the element M in the composite tungsten oxide fine particles, and therefore the near-infrared shielding property deteriorates over time.

Based on the above estimation, by adding a metal deactivator or a metal salt as an additive to the dark powder dispersion liquid, the inventors have come up with the following configuration. Due to addition of the metal deactivator or the metal salt as an additive to the dark powder dispersion liquid, the metal deactivator or the metal salt is present in the dark powder dispersion body or the colored layer-attached base material. With this configuration, the metal deactivator and the metal salt are present in the vicinity of and/or on the surface of the infrared shielding material fine particles. Then, an action of the metal deactivator and the metal salt sufficiently traps humidity that enters from the air. Further, metal ions derived from the dark powder and radicals generated by ultraviolet rays are captured by the action of this metal deactivator and metal salt, and chain generation of harmful radicals is suppressed. As a result, it is found that deterioration of the infrared shielding property over time can be suppressed.

There are many unknown points about the action of these metal deactivator and metal salt, and it is conceivable that actions other than those described above works. Therefore, the actions are not limited to the above actions.

Preferably, specific examples of the metal deactivator include: salicylic acid derivatives N-(2H-1,2,4-triazol-5-yl) salicylamide, N,N-bis(6,5-di-t-butylsalicyloyl)hydrazine, N,N-bis (6-t-butylmethylsalicyloyl) hydrazine, etc., hydrazine derivative dodecanedioic acid bis[N2-(2-hydroxybenzoyl)hydrazide], 3-(3,5-di-tert-butyl-4-hydroxyphenyl)-N'-[3-(3,5-di-tert-butyl-4-hydroxyphenyl)propanoyl] propanehydrazide, etc., oxalic acid derivatives N,N'-bis[2-[2-(3,5-di-tert-butyl-4-hydroxyphenyl)ethylcarbonyloxy] ethyl]oxamide, N'-benzylidene hydrazide, oxalyl-bis (benzylidene hydrazide) etc.

Further, specific examples of the metal salt include: magnesium lactate, aluminum lactate, calcium lactate, etc., and carbonates such as calcium carbonate, magnesium carbonate (magnesium carbonate hydroxide), strontium carbonate, etc.

Further, an amount of the metal deactivator or the metal salt to be added (however, in the present invention, when the metal deactivator or the metal salt contains water of crystallization or water of hydration, the mass of the metal deactivator and the metal salt itself excluding the mass of the water of crystallization and water of hydration is defined as an added amount.) is preferably twice or more or 10 times or less when expressed as a mass ratio of the dark pigment. This is because an effect of the metal deactivator or the metal salt can be obtained by adding twice or more when expressed as the mass ratio of the dark pigment, and on the other hand, by adding 10 times or less of the dark pigment in mass ratio, it is possible to avoid the inability to maintain the transparency of the film due to light scattering caused by the metal deactivator or the metal salt.

It is preferable to add various metal deactivators and metal salts to the dark powder dispersion liquid after preparing the dark powder dispersion liquid. Then, when the metal deactivator or the metal salt is powder, in order to suppress an occurrence of light scattering in the dark powder dispersion body or in the colored layer-attached base material, it is preferable to reduce a particle size. Specifically, a particle size of 5 nm to 100 nm is desirable. When a thickness is 100 nm or less, the light scattering can be suppressed, and transparency of the film can be ensured. When the particle size is 5 nm or more, it is possible to avoid excessive pulverization of the metal deactivator and the metal salt, which is preferable from a viewpoint of productivity.

From the above viewpoint, when the metal deactivator or the metal salt is powdery, it is preferable to mix the powdered metal deactivator or metal salt with an appropriate solvent and perform pulverization to prepare a pulverization liquid.

The solvent is not particularly limited, and may be appropriately selected according to a dark powder dispersion system, the dark powder dispersion body, and the colored layer-attached base material. For example, it is possible to use water, various organic solvents such as alcohols such as ethanol, propanol, butanol, isopropyl alcohol, isobutyl alcohol, diacetone alcohol, ethers such as methyl ether, ethyl ether, propyl ether, esters, ketones such as acetone, methyl ethyl ketone, diethyl ketone, cyclohexanone, isobutyl ketone, methyl isobutyl ketone, and aromatic hydrocarbons such as toluene. Further, a resin monomer or oligomer may be used as the solvent. Further, a liquid resin in which a styrene resin, etc., is dissolved in toluene, or a liquid plasticizer for plastics may be used.

Further, the mixture of the solvents described above may also be used.

As the above-described pulverization method, a general pulverization method can be used, and a bead mill, a ball mill, a sand mill, a paint shaker, an ultrasonic homogenizer, etc., can be used.

When adding the prepared pulverization liquid to the dark powder dispersion liquid, for example, it is preferable to uniformly disperse the pulverization liquid into the dark powder dispersion liquid by performing ultrasonic treatment for 5 to 10 minutes.

(4) Dark Powder Dispersion Body

The dark powder dispersion body according to the present invention is obtained by dispersing the above-described dark pigment and composite tungsten oxide fine particles in a suitable solid medium.

Specifically, a resin constituting a solid medium is added to a dark powder dispersion liquid to obtain a dispersion liquid (coating liquid) for forming a dark powder dispersion body. Then, by coating a surface of an appropriate base material with the dispersion liquid for forming a dark powder dispersion body, then, removing the solvent by a predetermined method such as evaporation, and curing the resin, a colored layer-attached base material is obtained in which the dark powder dispersion body is provided as a colored layer on the surface of the base material.

A dispersion state and a mixing ratio of the dark pigment and the composite tungsten oxide fine particles in the dark powder dispersion liquid are maintained in the dark powder dispersion body obtained from the dark powder dispersion liquid according to the present. As a result, according to the dark powder dispersion body of the present invention, 10 or less of chroma $c^*$ and 50% or less of a near-infrared transmittance can be achieved, when a dispersion liquid (coating liquid) for forming a dark powder dispersion body is formed by diluting a masterbatch described later with a solid medium resin so that a visible light transmittance is 5 to 70%, the chroma $c^*$ is preferably 5 or less, more preferably 4 or less, and even more preferably 3 or less. By lowering the chroma $c^*$, a deep black that can be visually confirmed can be realized, and the windows of automobiles and buildings can be made a deep black, thereby improving a design.

Further, when a Cu—Fe—Mn composite oxide pigment and/or a Cu—Cr composite oxide pigment is selected as a dark pigment, the visible light transmittance and the near-infrared transmittance can be desired values while keeping the value of $c^*$ below 4.5, by controlling the mixing ratio of the dark pigment, composite tungsten oxide fine particles, resin, etc., in the dark powder dispersion body mixed with the composite tungsten oxide fine particles and a resin which is a medium, etc. As a result, this is a preferable configuration because it facilitates a development of the dark powder dispersion body having optical properties according to usage, etc.

Further, a resin monomer that becomes a solid medium when being cured, may be used as a solvent for the dark powder dispersion liquid according to the present invention. When the resin monomer is used as a solvent, a coating method is not particularly limited as long as the surface of a base material can be uniformly coated with a near-infrared shielding material fine particle dispersion body. Examples thereof include bar coating, gravure coating, spray coating, dip coating, etc. Further, according to the dark powder dispersion body in which a dark pigment and composite tungsten oxide fine particles are dispersed directly in a binder resin, evaporation of the solvent is not required after coating the surface of the base material, which is environmentally and industrially preferable.

As the solid medium described above, for example, a UV curable resin, a thermosetting resin, an electron beam curable resin, a room temperature curable resin, a thermoplastic resin, etc., can be selected depending on the purpose. Specific examples thereof include: polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin, and polyvinyl butyral resin. These resins may be used singly or in combination.

Further, it is also possible to produce a dark powder dispersion body by volatilizing a solvent component in the dark powder dispersion liquid containing a polymer dispersant, then, producing a dark pigment-containing masterbatch by mixing a dark pigment dispersion powder containing the dark pigment, the composite tungsten oxide fine particles, and the polymer dispersant, with a polycarbonate resin, etc., melted at a temperature higher than a melting temperature, then, melting and mixing the masterbatch with a polycarbonate resin, etc., melted at a temperature higher than the melting temperature, and forming it into a film or a board by a known method.

(5) Colored Layer-Attached Base Material

A colored layer-attached base material can be obtained by providing the dark powder dispersion body according to the present invention as a colored layer on the surface of a transparent base material such as a transparent glass base material or a transparent film base material. A plate glass such as a soda lime glass can be used as the transparent glass base material, and a resin film such as a PET film can be used as the transparent film base material.

Of course, the dark powder dispersion body may be sandwiched between two or more transparent base materials to form a colored layer-attached base material.

EXAMPLES

The present invention will be described more specifically with reference to examples.

First, an evaluation method will be described in an order of (1) visible light transmittance and near-infrared transmittance, (2) $L^*$, $a^*$, $b^*$ color system characteristics and chroma $c^*$, and (3) average dispersed particle size.

(1) Visible Light Transmittance and Near-Infrared Transmittance

A visible light transmittance and a near-infrared transmittance of a sample were measured with a spectrophotometer (UH4150 manufactured by Hitachi, Ltd.). Then, the visible light transmittance and the near-infrared transmittance were measured at a wavelength from 750 nm to 1500 nm according to ISO9050.

(2) L*, a*, b* Color System Characteristics and Chroma c*

L*, a*, b* color system characteristics of the samples were measured with a spectrophotometer (Hitachi UH4150). Chroma c* was calculated by the following formula 2.

$$\text{Chroma } c^* = (a^{*2} + b^{*2})^{1/2} \qquad \text{Formula 2}$$

The L* a*, b* color system characteristics were measured by the following procedure.

A spectral transmittance (wavelength dependence of transmittance) of the sample is measured.

Based on JIS Z 8701 1999, the measured spectral transmittance is converted into $X_{10}$, $Y_{10}$, and $Z_{10}$ color values in a 10° field of view of a D65 light source.

The converted $X_{10}$, $Y_{10}$, $Z_{10}$ tint values are converted to L*, a*, b* based on JIS Z 8781-4 2013.

(3) Average Dispersed Particle Size

An average dispersed particle size was measured using an ELS-8000 manufactured by Otsuka Electronics Co., Ltd. based on a dynamic light scattering method.

Examples 1 to 12, Comparative Examples 1 to 8

(a) Preparation of a Dark Powder Dispersion Liquid

Preparation of a Cu—Fe—Mn composite oxide pigment dispersion liquid will be described as a dark powder dispersion liquid.

100 parts by mass of Cu—Fe—Mn composite oxide pigment (Dainichiseika Dipyroxide TM Black #3550), 800 parts by mass of MIBK as a solvent, 100 parts by mass of a dispersant a (a dispersant having an amine-containing group and an acrylic backbone, amine value 42 mgKOH/g), were put in a container, which were then pulverized in a paint shaker for 20 hours using 0.3 mm zirconia beads. Then, a dispersion liquid of a Cu—Fe—Mn composite oxide pigment having an average dispersed particle size of 100 nm was obtained.

As a dark powder dispersion liquid, preparation of a Cu—Cr mixed oxide pigment dispersion liquid will be described.

100 parts by mass of Cu—Cr composite oxide pigment (Dainichiseika Dipyroxide Black #9510), 800 parts by mass of MIBK as a solvent, and 100 parts by mass of a dispersant a were put in a container, which were then pulverized in a paint shaker for 20 hours using 0.3 mm zirconia beads. Then, a Cu—Fe—Mn mixed oxide pigment dispersion liquid having an average dispersed particle size of 150 nm was obtained.

(b) Preparation of Composite Tungsten Oxide Fine Particle Dispersion Liquid

Preparation of a $Cs_{0.33}WO_3$ particle dispersion liquid as a composite tungsten oxide fine particle dispersion liquid will be described.

100 parts by mass of $Cs_{0.33}WO_3$ particles (manufactured by Sumitomo Metal Mining), 300 parts by mass of MIBK as a solvent, and 100 parts by mass of dispersant a are placed in a container, which were then pulverized in a paint shaper for 20 hours using 0.3 mm zirconia beads. Then, a $Cs_{0.33}WO_3$ particles dispersion liquid having an average dispersed particle size of 30 nm was obtained.

(c) Preparation of Dark Powder Dispersion Liquid and a Dispersion Liquid (Coating Liquid) for Forming a Dark Powder Dispersion Body 100 parts by mass of a Cu—Fe—Mn composite oxide pigment dispersion liquid and 100 parts by mass of a $Cs_{0.33}WO_3$ particle dispersion liquid were mixed to prepare a dark powder dispersion liquid according to examples 1 to 3.

20 parts by mass of Cu—Fe—Mn composite oxide pigment dispersion liquid and 100 parts by mass of $Cs_{0.33}WO_3$ particle dispersion liquid were mixed to prepare a dark powder dispersion liquid according to examples 4 to 7.

10 parts by mass of Cu—Fe—Mn composite oxide pigment dispersion liquid and 100 parts by mass of $Cs_{0.33}WO_3$ particle dispersion liquid were mixed to prepare a dark powder dispersion liquid according to examples 8 and 10 to 12.

20 parts by mass of a Cu—Cr composite oxide pigment dispersion liquid and 100 parts by mass of $Cs_{0.33}WO_3$ particle dispersion liquid were mixed to prepare a dark powder dispersion liquid according to example 9.

Only 100 parts by mass of $Cs_{0.33}WO_3$ particle dispersion liquid was used as a dark powder dispersion liquid according to comparative examples 1 to 5.

Only 100 parts by mass of Cu—Fe—Mn mixed oxide pigment dispersion liquid was used as a dark powder dispersion liquid according to comparative examples 6 to 8.

Further, in the dark powder dispersion liquid according to example 10, 800 parts by mass of magnesium carbonate hydroxide (manufactured by Kanto Kagaku) was added to 100 parts by mass of $Cs_{0.33}WO_3$ particles.

Further, in the dark powder dispersion liquid according to example 11, 632 parts by mass of magnesium lactate (manufactured by Kanto Kagaku) was added to 100 parts by mass of $Cs_{0.33}WO_3$ particles.

Since the magnesium lactate (manufactured by Kanto Kagaku) was a trihydrate, an amount of added magnesium lactate containing hydrated water was 800 parts by mass.

Further, in the dark powder dispersion liquid according to example 12, a salicylic acid derivative (N-(2H-1,2,4-triazol-5-yl) salicylamide) (manufactured by ADEKA) was added to 100 parts by mass of $Cs_{0.33}WO_3$ particles so as to be 200 parts by mass.

Table 1 shows a mixing ratio of the dark powder dispersion liquid according to examples 1 to 12 and comparative examples 1 to 8.

An ultraviolet curing resin (Aronix UV3701 manufactured by Toagosei Co., Ltd.) was mixed with each of the dark powder dispersion liquids according to examples 1 to 12 and comparative examples 1 to 8, to prepare a dispersion liquid (coating liquid) for forming a dark powder dispersion body according to examples 1 to 12 and comparative examples 1 to 8.

Here, in the dispersion liquid (coating liquid) for forming a dark powder dispersion body according to examples 1 to 12 and comparative examples 1 to 8, the dark powder dispersion liquid and UV curable resin were mixed, aiming for the visible light transmittance of the dark powder dispersion liquid after curing described later to be 40% in example 1, 35% in example 2, 30% in example 3, 65% in example 4, 50% in example 5, 35% in example 6, 20% in example 7, 65% in example 8, 55% in example 9, 65% in example 10, 65% in example 11, 65% in example 12, 15% in comparative example 1, 30% in comparative example 2, 40% in comparative example 3, 50% in comparative example 4, 65% in comparative example 5, 40% in comparative example 6, 30% in comparative example 7, and 20% in comparative example 8.

(d) Preparation of Dark Powder Dispersion Body and Colored Layer-Attached Base Material A PET film having a thickness of 50 μm was coated with each of the dispersion liquids (coating liquids) for forming a dark powder dispersion body according to examples 1 to 12 and comparative examples 1 to 8, with No. 4 to No. 10 bar coaters to obtain a coating film. After evaporating the solvent from the obtained coating film to be dried (heating at 70° C. for 1 minute), the coating film gas cured under irradiation of ultraviolet rays using a high-pressure mercury lamp to provide a dark powder dispersion body on the surface of the PET film. The provided dark powder dispersion body is a colored layer, and the colored layer was formed on the surface of the PET film and used as a sample film. This means that the colored layer-attached base materials according to examples 1 to 12 and comparative examples 1 to 8 were prepared.

As for the colored layer-attached base materials prepared according to examples 1 to 12 and comparative examples 1 to 8, the chroma c*, visible light transmittance, and near-infrared transmittance were measured. Table 1 shows the results. In the measurement of the chroma, visible light transmittance, and near infrared transmittance, values including the PET film as a base material were measured.

(e) Evaluation of Humidity and Heat Resistance of the Colored Layer-Attached Base Material As for the colored layer-attached base materials (sample films) according to examples 8 and 10 to 12, a change in a transmission spectrum was measured in an environment of a temperature of 85° C. and a relative humidity of 90%, and thereafter, a change in absorbance over time at a wavelength of 1000 nm calculated from the transmission spectrum was evaluated.

Evaluation of the colored layer-attached base material sample (sample film) was performed in the following procedure.

First, a transmission spectrum of the prepared sample film was measured in a wavelength range of 200 nm to 2600 nm to obtain a transmittance at a wavelength of 1000 nm. Thereafter, the sample film was placed in a constant temperature and humidity chamber with a temperature of 85° C. and a relative humidity of 90%. After a predetermined number of days passed after the sample film was placed in, the sample film was taken out, and a transmission spectrum was measured in the wavelength range described above to obtain the transmittance at a wavelength of 1000 nm. Thereafter, the sample film was placed again in the constant temperature and humidity chamber under the above temperature and humidity conditions, and after a predetermined number of days had passed, the sample film was taken out again and the transmittance at a wavelength of 1000 nm was determined repeatedly.

Then, the transmittance at the wavelength of 1000 nm was converted into absorbance using the following formula 3, and a rate of change in absorbance from the start of a test was determined.

Figure 1:
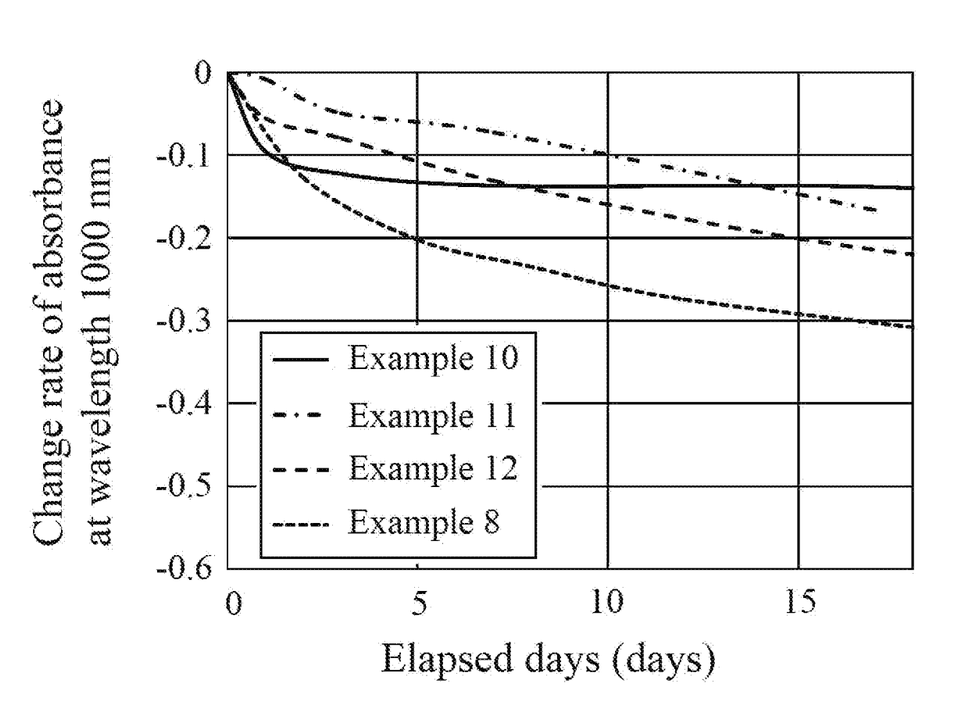
FIG. 1 is a graph showing an evaluation result of humidity and heat resistance, in which a colored layer-attached base material according to examples 8 and 10 to 12, is used.

Table 2 shows a rate of change in absorbance of the sample film after a predetermined number of days from the start of the test, and FIG. 1 shows a rate of change in absorbance of the sample film after a predetermined number of days from the start of the test, as for the colored layer-attached base material according to examples 8 and 10 to 12.

In FIG. 1, a vertical axis is the rate of change in absorbance at a wavelength of 1000 nm, and a horizontal axis is elapsed days.

Then, data of the sample film of example 8 is indicated by a short dashed line, data of the sample film of example 10 is indicated by a solid line, data of the sample film of example 11 is indicated by a dashed line, and data of the sample film of example 12 is indicated by a long broken line.

$$\text{Absorbance}=-\log(\text{transmittance}) \quad \text{Formula 3}$$

(f) Conclusion

When comparing example 1, comparative example 3, and comparative example 6, which are formulations aimed at a visible light transmittance of 40%, measured values of the visible light transmittance are all about 40%. On the other hand, the chroma c* was found to be low in example 1.

Similarly, when comparing example 3, comparative example 2, and comparative example 7, which are formulations aimed at a visible light transmittance of 30%, measured values of the visible light transmittance are all about 30%. On the other hand, the chroma c* was found to be low in example 3.

Similarly, when comparing example 7 and comparative example 8, which are formulations aimed at a visible light transmittance of 20%, measured values of the visible light transmittance are all about 20%. On the other hand, the chroma c* was found to be low in example 7.

Similarly, when comparing example 4 and comparative example 5, which are formulations aimed at a visible light transmittance of 65%, measured values of the visible light transmittance are all about 65%. On the other hand, the chroma c* was found to be low in example 4.

Then, the visible light transmittance and the near-infrared transmittance could be desired values while maintaining the value of c* at 4.5 or less, by selecting the Cu—Fe—Mn composite oxide pigment or the Cu—Cr composite oxide pigment as a dark pigment, and by changing a mixing ratio in the dark powder dispersion body that is a mixture of the dark pigment, the composite tungsten oxide fine particles and a medium such as a resin Next, the following was found from FIG. 1 showing the results of the evaluation of humidity and heat resistance, in which the colored layer-attached base materials according to examples 8 and 10 to 12 are used.

When comparing example 8 and example 10, it was found that the rate of change in absorbance over time is smaller in example 10. It is estimated that this is because metal ions in the colored layer-attached base material are captured by carbonate ions in the additive carbonate, thereby suppressing deterioration of the $Cs_{0.33}WO_3$ particles.

Similarly, when example 8 and example 11 were compared, it was found that the rate of change in absorbance over time is smaller in example 11. It is estimated that this is because metal ions in the colored layer-attached base material are captured by lactate ions in the additive magnesium lactate, thereby suppressing deterioration of the $Cs_{0.33}WO_3$ particles.

Similarly, when comparing example 8 and example 12, it was found that the rate of change in absorbance over time is smaller in example 12. It is estimated that this is because metal ions in the colored layer-attached base material are captured by additive salicylic acid derivative, thereby suppressing deterioration of the $Cs_{0.33}WO_3$ particles.

From the evaluation of the humidity and heat resistance in which the colored layer-attached base materials according to examples 8 and 10 to 12 are used, it was found that by adding a metal deactivator or a metal salt to a film in which the dark powder dispersion liquid is used, the rate of change in absorbance after 15 days (360 hours) at a wavelength of 1000 nm can be suppressed by 30% to 50% compared to a film in which an additive-free dark powder dispersion liquid is used.

As described above, it was found that by adding the salicylic acid derivative or the metal salt to the dark powder dispersion body which is a mixture of the Cu—Fe—Mn composite oxide pigment as a dark pigment, the composite tungsten oxide fine particles, and the medium resin, etc., it is possible to suppress the change in absorbance of the dark powder dispersion body, that is, to improve the humidity and heat resistance.

TABLE 1

| | dark pigment | | composite tungsten oxide | | additive | | | visible light transmittance (%) | near-infrared transmittance (%) |
|---|---|---|---|---|---|---|---|---|---|
| | kind | mixing ratio (part by mass) | kind | mixing ratio (part by mass) | kind | mixing ratio (part by mass) | c* | | |
| Example 1 | Cu—Fe—Mn | 100 | $Cs_{0.33}WO_3$ | 100 | — | — | 2.3 | 40.5 | 42.4 |
| Example 2 | Cu—Fe—Mn | 100 | $Cs_{0.33}WO_3$ | 100 | — | — | 3.4 | 35.4 | 38.4 |
| Example 3 | Cu—Fe—Mn | 100 | $Cs_{0.33}WO_3$ | 100 | — | — | 2.7 | 29.4 | 31.2 |
| Example 4 | Cu—Fe—Mn | 20 | $Cs_{0.33}WO_3$ | 100 | — | — | 1.6 | 64.7 | 38.9 |
| Example 5 | Cu—Fe—Mn | 20 | $Cs_{0.33}WO_3$ | 100 | — | — | 2.6 | 49.8 | 19.8 |
| Example 6 | Cu—Fe—Mn | 20 | $Cs_{0.33}WO_3$ | 100 | — | — | 3.4 | 35.9 | 9.3 |
| Example 7 | Cu—Fe—Mn | 20 | $Cs_{0.33}WO_3$ | 100 | — | — | 4.4 | 21.1 | 2.7 |
| Example 8 | Cu—Fe—Mn | 10 | $Cs_{0.33}WO_3$ | 100 | — | — | 2.9 | 63.8 | 21.7 |
| Example 9 | Cu—Cr | 20 | $Cs_{0.33}WO_3$ | 100 | — | — | 3.9 | 55.4 | 21.0 |
| Example 10 | Cu—Fe—Mn | 10 | $Cs_{0.33}WO_3$ | 100 | A | 800 | 2.4 | 64.2 | 27.4 |
| Example 11 | Cu—Fe—Mn | 10 | $Cs_{0.33}WO_3$ | 100 | B | 800 | 2.1 | 68.1 | 35.0 |
| Example 12 | Cu—Fe—Mn | 10 | $Cs_{0.33}WO_3$ | 100 | C | 200 | 4.2 | 63.2 | 13.7 |
| Com.ex. 1 | — | — | $Cs_{0.33}WO_3$ | 100 | — | — | 24.4 | 14.4 | 0.0 |
| Com.ex. 2 | — | — | $Cs_{0.33}WO_3$ | 100 | — | — | 21.6 | 27.0 | 0.0 |
| Com.ex. 3 | — | — | $Cs_{0.33}WO_3$ | 100 | — | — | 18.7 | 37.1 | 0.1 |
| Com.ex. 4 | — | — | $Cs_{0.33}WO_3$ | 100 | — | — | 14.4 | 51.4 | 0.4 |
| Com.ex. 5 | — | — | $Cs_{0.33}WO_3$ | 100 | — | — | 11.0 | 62.6 | 1.6 |
| Com.ex. 6 | Cu—Fe—Mn | 100 | — | — | — | — | 4.4 | 40.0 | 58.5 |
| Com.ex. 7 | Cu—Fe—Mn | 100 | — | — | — | — | 5.1 | 31.0 | 64.8 |
| Com.ex. 8 | Cu—Fe—Mn | 100 | — | — | — | — | 6.1 | 19.7 | 70.2 |

Com.ex. = Comparative example
A = Mg carbonate hydroxide
B = Mg lactate
C = Salicylic acid derivative

TABLE 2

| | Elapsed days from start of test (days) | | | | | | | | | |
|---|---|---|---|---|---|---|---|---|---|---|
| | 1 | 2 | 3 | 5 | 7 | 8 | 12 | 15 | 16 | 17 |
| Example 8 | — | −0.13 | — | −0.20 | — | −0.23 | −0.27 | — | — | — |
| Example 10 | −0.09 | — | −0.12 | — | −0.14 | — | — | — | −0.138 | — |
| Example 11 | −0.01 | — | −0.05 | — | −0.07 | — | — | — | — | −0.166 |
| Example 12 | −0.06 | — | −0.08 | — | −0.13 | — | — | −0.201 | — | — |

The invention claimed is:

1. A dark powder dispersion liquid, comprising:
a dark pigment, wherein the dark pigment is one or more kinds selected from the group consisting of Cu—Fe—Mn composite oxide pigment, Cu—Cr composite oxide pigment, Cu—Fe—Mn composite oxide pigment, Cu—Fe—Mn—Ni composite oxide pigment, Cu—Cr—Fe composite oxide pigment, Fe—Cr composite oxide pigment, Co—Cr—Fe composite oxide pigment, titanium black, titanium nitride, titanium oxynitride, dark azo pigment, perylene black pigment, and aniline black pigment;
composite tungsten oxide particles;
and a solvent,
wherein a mass ratio of the dark pigment to the composite tungsten oxide particles (mass of dark pigment/mass of composite tungsten oxide fine particles) is 0.01 or more and 5 or less.

2. The dark powder dispersion liquid according to claim 1, wherein the composite tungsten oxide fine particles include a hexagonal crystal structure.

3. The dark powder dispersion liquid according to claim 1, wherein the dark pigment is particles having an average dispersed particle size of 200 nm or less.

4. The dark powder dispersion liquid according to claim 1, wherein the dark powder dispersion liquid includes one or more selected from metal deactivators and metal salts.

5. The dark powder dispersion liquid according to claim 1, wherein the solvent is selected from water, organic solvents, fats, liquid resins, liquid plasticizers for plastics, or a mixture of them.

6. A dark powder dispersion body, comprising:
a dark pigment, wherein the dark pigment is one or more kinds selected from the group consisting of Cu—Fe—Mn composite oxide pigment, Cu—Cr composite oxide pigment, Cu—Fe—Mn composite oxide pigment, Cu—Fe—Mn—Ni composite oxide pigment, Cu—Cr—Fe composite oxide pigment, Fe—Cr composite oxide pigment, Co—Cr—Fe composite oxide pigment, titanium black, titanium nitride, titanium oxynitride, dark azo pigment, perylene black pigment, and aniline black pigment;

composite tungsten oxide particles; and
a solid medium,
wherein a mass ratio of the dark pigment to the composite tungsten oxide particles (mass of dark pigment/mass of composite tungsten oxide fine particles) is 0.01 or more and 5 or less.

7. The dark powder dispersion body according to claim 6, wherein the composite tungsten oxide particles include a hexagonal crystal structure.

8. The dark powder dispersion body according to claim 6, wherein the dark pigment is particles having an average dispersed particle size of 200 nm or less.

9. The dark powder dispersion body according to claim 6, wherein the dispersion body comprises one or more selected from metal deactivators or metal salts.

10. The dark powder dispersion body according to claim 6, wherein the solid medium is a resin.

11. A colored layer-attached base material, wherein a colored layer is provided on at least one surface of a transparent base material, and the colored layer is the dark powder dispersion body of claim 6.

12. The colored layer-attached base material according to claim 11, wherein the transparent base material is a transparent film base material or a transparent glass base material.

* * * * *